United States Patent Office 3,671,283
Patented June 20, 1972

3,671,283
EMBOSSED PLASTIC SURFACE COVERING AND METHOD OF PREPARING SAME
Richard P. Crowley, 125 High St.,
Wellesley Hills, Mass. 02110
No Drawing. Filed June 3, 1970, Ser. No. 43,223
Int. Cl. B44d 1/14; B32b 3/30
U.S. Cl. 117—9                                    9 Claims

ABSTRACT OF THE DISCLOSURE

A chemically embossed vinyl chloride resin sheet material is prepared by treating the gelled surface of a vinyl chloride resin plastisol containing a blowing agent with an aqueous latex of a vinyl chloride resin, whereby on subsequent heating of the treated gelled vinyl chloride resin sheet material to decompose the blowing agent and drive off the water of the latex, full expansion of the sheet material is prevented by the increase in resin content in the treated areas, thereby producing a chemically embossed product.

BACKGROUND OF THE INVENTION

Methods of imparting an embossed appearance to a cellular sheet include both chemical and mechanical embossing methods. U.S. Patent 3,365,353, issued Jan. 23, 1968, describes a method of chemically embossing a vinyl chloride resin cellular sheet material. This method incorporates a monomer compatible with a plasticized vinyl chloride into plastisol which is formed into a gelled resin sheet. A liquid containing a catalyst that will effect polymerization of the monomer in the formed vinyl chloride resin sheet is then applied in a predetermined pattern to one surface of the sheet and the resulting sheet heated to fuse the plasticized resin, decompose the blowing agent and to polymerize the monomer only in those areas where the catalyst has been applied, thereby obtaining a chemically embossed sheet material.

U.S. Patents 3,293,094 and 3,293,108, issued Dec. 20, 1966 both disclose the use of certain compounds to regulate and inhibit the full decomposition of a chemical blowing agent employed in a thermoplastic sheet material. Chemical embossing is effected through alteration of the decomposition temperature of the chemical blowing agent in the treated areas, thereby producing a chemically embossed product. U.S. Patent 3,453,151, issued July 1, 1969, discloses preventing the expansion of a plastic material through the use of a cross-linking agent in a certain treating area, the cross-linking agent, for example, being an organic peroxide or an azonitrile or a beam of atomic or subatomic particles. U.S. Patent 3,458,337, issued July 29, 1969, employs an agent which suppresses the catalytic action of an organozinc catalyst in a thermoplastic resin contained in a gas-expandable sheet so that on decomposition, a textured chemically embossed surface covering is prepared.

SUMMARY OF THE INVENTION

My invention concerns a method of preparing a chemically embossed cellular product, such as a sheet material, which method comprises providing a gas-expandable thermoplastic resin which contains a blowing agent subject to expansion or decomposition on heating, applying to predetermined surface areas of the gas-expandable resin a liquid composition which comprises a compound, such as a polymer or a monomer subject to polymerization, alone or with other compounds in the composition or in the resin, the compound contained in a nonsolvent, nonplasticizing liquid carrier; and heating the thermoplastic resin to a temperature sufficient to volatilize the liquid carrier and to expand the resin and to form a cellular product characterized by an embossed surface pattern thereon. Those areas of the sheet material which have been treated with the liquid composition will inhibit the full expansion of the sheet material on decomposition of the blowing agent and consequently represent those depressed or embossed areas of the resulting sheet product.

My method permits the modification and alteration of a thermoplastic sheet material only in those particular areas and to the depth desired where the chemical embossing is required. My method is particularly adapted to the production of laminate-type sheet materials wherein the gas-expandable thermoplastic resin layer is cast or laminated onto a woven or nonwoven fibrous or nonfibrous supporting serim or base sheet and where a clear transparent wear-resistant thin resin top layer is applied prior to creating the chemically embossed product. Such product is particularly adapted for use as a floor tile product, while when placed on a woven, knitted or stretchable fabric base may be employed as a wall or upholstery covering or for use in garments, boots, shoes, handbags and the like.

My invention in particular concerns the preparation of a chemically embossed cellular plasticized vinyl chloride resin sheet material, which method comprises casting a vinyl chloride resin plastisol containing azodicarbonamide as a bowling agent into a thin layer onto a supporting material, heating the cast plastisol to a temperature insufficient to decompose the blowing agent but sufficient to form a gelled layer; e.g., 120–160° C.; printing onto the smooth, gelled plastisol surface an aqueous latex composition which contains from about 20 to 60% of a vinyl chloride resin; permitting the composition to penetrate the gelled layer to the desired degree; and thereafter, heating the resulting treated product to a temperature of 170–230° C. to provide for fusion of the vinyl chloride resin, to decompose the blowing agent and to volatilize the water employed in the latex composition in those particular areas where the latex was applied, thereby providing a cellular plasticized vinyl chloride resin-embossed product.

The thermoplastic resin suitable for use in my invention includes, but is not limited to, those gas-expandable organic thermoplastic resinous materials, such as those polymers and copolymers of vinyl resins like vinyl chloride resins to incude polyvinyl chloride and copolymers of vinyl chloride with short-chain fatty acids of vinyl esters, such as vinyl acetate or vinylidene chloride, vinylbutyrate and such materials as well as olefinic resins, such $C_2$–$C_4$ olefinic resins of polypropylene, polyethylene, ethylene-propylene copolymers and terpolymers and the like. The thermoplastic resins may be suitably plasticized, such as by the use of ester-type plasticizers like adipates, sebacates, phthalates and may contain those other additives normally employed, such as metal salt stabilizers, fillers, pigments, dyes, solvents, secondary plasticizers, viscosity control additives and the like. The selection of the blowing agent to be employed depends upon the melt viscosity index and other factors of the polymer, which blowing agents and their selection are well known.

The liquid compositions particularly suitable for use in my invention include those aqueous latices containing a polymer which will reduce the thermoplasticity of the area wherein the liquid composition is applied. In particular, a polymeric material should be selected which is compatible with the surface to be treated. It is particularly preferred that a similar polymer be employed, but which polymer has reduced thermoplasticity characteristics over the surface polymer to which it is being applied, such as having a slightly different structural composition or a higher molecular weight so as to reduce the melt viscosity of the treated areas at the temperature of expansion of the treated surface. For example, in the treatment of a gelled polyvinyl chloride surface, it is preferred that the polymer be composed of a vinyl chloride copolymer having a reduced thermoplasticity from the polyvinyl chloride. It is important that the liquid composition comprise a liquid carrier, such as water or water and alcohol, which does not plasticize or solvatize the surface on which it is being employed; that is, it should be a nonsolvent and nonplasticizer and yet, have a boiling point low enough so that it is removed or substantially removed prior to substantial expansion of the treated surface. The employment of solvents or plasticizer in the latex composition should be avoided, since these components would tend to reduce the effect desired by adding additional resin to the treated areas. The use of polymeric latex compositions avoids the problems associated with the use of organosols or plastisols or solvent solutions of the resins, which, on application, plasticize, solvatize and countereffect the reduced thermoplasticity in that area due to the additional resin. Furthermore, the use of latex compositions permits the employment of liquid compositions containing a high amount of resin so that on evaporation of the liquid carrier, the remaining resin which has penetrated, for example, the gelled vinyl chloride sheet, will inhibit the full expansion over the remaining untreated areas and thereby produce a chemically embossed product.

The term "latex" will be employed to cover emulsion, slurries, dispersions and similar liquid compositions wherein a monomeric or polymeric material is dispersed in a nonsolvent, nonplasticizing liquid carrier, such as water or water and alcohol, and used in treating a gas-expandable thermoplastic resin material. The monomers or polymers employed in such latex composition are usually present in an amount of from 20 to 60% by weight, for example, 30 to 50%. The latex composition may contain slight noninterfering amounts of plasticizer, solvents, stabilizers, dispersing aids, surfactants, silicones and the like. The latex compositions useful in my invention would include those which contain vinyl resins, such as polyvinyl chloride and vinyl chloride copolymers, such as vinyl chloride-vinyl acetate, vinyl chloride and vinylidene chloride and copolymers thereof as well as acrylic resins, such as polymethacrylates, and olefinic resins, such as polyethylene, polypropylene, ethylene-propylene copolymers and similar thermoplastic resinous material.

If desired, a polymeric material may be employed which is not compatible with the surface to be treated, thereby producing distinct design effects and which polymeric material may be either thermoplastic to reduce the thermoplasticity of the thermoplastic treated surface or be a curable or hardenable polymeric material. Typical latex compositions containing these materials would include natural and synthetic elastomers, such as diene conjugated elastomers, such as natural rubber, styrene butadiene latex, nitrile rubbers such as acrylonitrile-butadiene-styrene rubbers, chloroprene. These materials may be employed alone or with curing agents so that upon heating and prior to substantial decomposition, the material is cured in situ or may be employed without curing agents so that their presence merely inhibits full expansion of the treated surface. Furthermore, other materials would include carboxylated natural and synthetic elastomers as well as phenol formaldehyde and other resin-curable novolaks.

Where the surface of the resin sheet material is to be printed, it is often desirable to accomplish both printing and treating in the same step, and accordingly, latex compositions should include those containing pigments, dyes and other coloring additives. Where time permits, deeper penetration and better embossing results may be obtained by aging the sheet prior to subsequent decomposition of the blowing agent and fusion of the resin.

For purposes of illustration only, my technique will be described in connection with the chemical embossing of a vinyl chloride resin sheet material employing the following formulations:

Example I

BASE COAT FORMULATION

Base coat ingredients: Parts by weight
  Copolymer vinyl chloride-vinyl acetate (12%) -- 50
  Polyvinyl chloride resin _____ 50
  Dioctylphthalate _____ 30
  Epoxidized soybean oil _____ 5
  Titanium dioxide pigment _____ 5
  Cadmium-zinc long-chain fatty soap stabilizer __ 4
  Azodicarbonamide blowing agent _____ 4

LATEX FORMULATION

Vinyl chloride-vinyl acetate resin _____ 40
  Surfactant _____ 0.1
  Water _____ 60

TOP COAT FORMULATION

Polyvinyl chloride resin _____ 80
  Dioctylphthalate _____ 20
  Dibutylphthalate _____ 5
  Barium cadmium organic soap stabilizer _____ 3
  Mineral spirits _____ 15

The base coat formulation is cast onto a resin reenforced asbestos sheet material in a thin wet film layer of about 10 to 25 mils; for example, 12 mils, and then heated to a temperature sufficient to gel the plastisol without decomposition of the blowing agent; for example, 100 to 135° C.; e.g., 120° C. for 3 to 15 minutes, for example, 5 minutes. The latex composition is then applied in a predetermined pattern to the top surface of the gelled vinyl chloride sheet and allowed to penetrate into the surface for approximately 1 to 10 minutes, while longer periods, 1 to 12 hours, are used for deeper chemical embossing. The treated sheet is then heated to a temperature of approximately 120 to 150° C. for 5 to 30 minutes in order to drive off the water of the latex. A top coat formulation is then cast in a thin wet layer from about 1 to 10 mils onto the treated gel surface and then the sheet material is heated in a hot air oven containing infrared heaters to a temperature of 170 to 200° C. for 3 to 10 minutes. Such heating decomposes the blowing agent and expands the sheet material into a cellular sheet product and provides for the fusion of the thermoplastic vinyl chloride resin, simultaneously increases the resistance to explansion in the treated areas resulting in a sheet which is chemically embossed.

Full expansion is prevented in the treated areas of the vinyl resin sheet due to the presence of the additional vinyl chloride-vinyl acetate resin which increases the resistance of the sheet to full expansion compared to neighboring areas where the plasticized resin is fully expanded. Prior to applying the top sheet, the treated vinyl chloride resin sheet is heated in order to drive off the water of the latex. On subsequent heating to attempt to decompose the chemical blowing agent, the unplasticized or less plasticized vinyl chloride resin in the treated areas will also become plasticized by picking up the plasticizers employed in the base coat, thereby giving an area which is less plasticized than the surrounding area and correspondingly, less prone to expand on decomposition of the blowing agent.

Example II

The foregoing example is repeated employing as a latex formulation an acrylic resin, such as polymethacrylic, in an amount of about 35% in a latex composition.

Example III

The Example I is repeated employing as the latex formulation one that also contains 20 parts by weight of a carboxylated vinyl resin (VMCC Union Carbide Corporation composed of 83% vinyl chloride, 16% vinyl acetate, and 1% maleic acid). A heat-reactive melamine-formaldehyde resin in the amount of 3 parts by weight is added to the latex composition to react with the carboxylic groups in the resin during the final heating step, thereby cross-linking the resin in the treated areas.

The latex composition may include as the resin or be blended with other resins carboxylated vinyl resins such as vinyl chloride-vinyl acetate resins containing interpolymerized carboxylic groups incorporated therein by the use of small amounts, e.g., 0.5 to 5.0% of unsaturated carboxylic acids, such as $C_2$–$C_5$ alpha, beta acids like itaconic, maleic, fumaric, acrylic and methacrylic acid and the like. The carboxylated resins are subjected to crosslinking by reaction with other resins such as melamine-formaldehyde resins, urea-formaldehyde resins, heat-reactive phenolic and epoxy resins and with isocyanate compounds. The amounts employed are sufficient to induce cross-linking of the reactive carboxylic groups such as 0.5 to 5.0%. Where carboxylated vinyl resins are employed alone or in major amounts, then due to the cross-linked nature of the resulting thermosetting resin, solvents and plasticizers may be used with such resin in larger amounts than with non-curable resins like other vinyl resins. Such resins can be applied to the surface in plastisol, organosol, or solvent and plasticized solutions or dispersions.

Example IV

A vinyl resin latex formulation may be used comprising an interpolymerized vinyl-acrylic resin, which resin is chemically reactive to provide a cross-linked chemically bonded resin structure. Where desired, the vinyl-acrylic resin may be incorporated with the less expensive vinyl chloride resin, e.g., 5 to 40% by weight or used alone or with other polymers or monomers. Cross-linking of the acrylic portion of the polymer can be accomplished by carboxylic group reactive compounds like melamine resins (see Example III) or by peroxides or other cross-linking agents or compounds activated by heat to induce cross-linking. Such resins can also be applied in solution, plastisol, or organosol or other formulations.

Example I is repeated employing a heat-reactive cross-linkabel vinyl chloride acrylic latex, such as GEON 460X1 latex (B. F. Goodrich Company). The vinyl chloride plastisol is gelled and the GEON 460X1 applied to the surface. The GEON cross-links at a temperature of about 225° F. or below (107° C.) so that subsequent heating will drive off the water of the latex and form a chemically embossed product.

Having thus described my invention and the manner of using the same, what is claimed is:

1. A method of preparing an embossed thermoplastic material containing a blowing agent which comprises:

(a) applying to a predetermined surface area of a gas-expandable gelled vinyl chloride resin material an aqueous polymeric latex composition;

(b) heating the treated material to a temperature sufficient to volatilize the water in the latex composition, but insufficient to substantially decompose the blowing agent; and (c) heating the dried treated vinyl chloride resin to a temperature sufficient to decompose the blowing agent and to form a cellular product characterized by an embossed surface pattern thereon, whereby full expansion of the vinyl chloride resin is prevented in those areas which have been treated.

2. The method of claim 1 wherein the polymeric material of the latex comprises a polymeric material which is compatible with the vinyl chloride resin.

3. The method of claim 1 wherein the polymer of the latex composition is selected from the group consisting of vinyl chloride resins and acrylate resins.

4. The method of claim 1 wherein the latex composition is in a natural and synthetic latex composition.

5. The method of claim 1 whehein the polymer of the latex composition comprises a vinyl chloride resin having a higher molecular weight than the vinyl chloride resin employed in the treated material.

6. The cellular embossed product produced by the method of claim 1.

7. The method of claim 1 wherein the gelled resin material contains a blowing amount of azodicarbonamide and the resin is a thin layer and is bonded to a base sheet material.

8. The method of claim 1 which includes prior to heating the dried treated resin, applying a thin layer of a vinyl chloride resin plastisol onto the surface of the dried treated resin, whereby on subsequent heating, the plastisol will gell and fuse to form a wear-resistant transparent top surface layer.

9. The method of claim 1 wherein the gelled vinyl chloride resin is a polyvinyl chloride resin, and the latex composition comprises a vinyl chloride-vinyl acetate copolymer.

References Cited
UNITED STATES PATENTS

| | | | |
|---|---|---|---|
| 3,399,106 | 8/1968 | Palmer et al. | 161—160 |
| 3,408,248 | 10/1968 | Maass | 161—160 |
| 3,574,659 | 4/1971 | Kwart et al. | 161—160 |

WILLIAM J. VAN BALEN, Primary Examiner

U.S. Cl. X.R.

117—38; 161—119, 125, 160